United States Patent [19]
Hosoda et al.

[11] Patent Number: 5,847,042
[45] Date of Patent: Dec. 8, 1998

[54] POLYOLEFIN RESIN COMPOSITION CONTAINING ANTI-BLOCKING AGENT

[75] Inventors: Satoru Hosoda; Satoru Koyama; Kenzo Chikanari, all of Chiba, Japan

[73] Assignee: Sumitomo Chemical Company, Limited, Osaka, Japan

[21] Appl. No.: 529,453

[22] Filed: Sep. 18, 1995

[30] Foreign Application Priority Data

Sep. 22, 1994 [JP] Japan .................................. 6-227887

[51] Int. Cl.⁶ ..................................................... C08L 53/02
[52] U.S. Cl. .......................... 524/506; 524/513; 524/514; 524/523; 524/528; 524/577; 524/524; 524/558; 525/100; 525/165; 525/166; 525/170; 525/178; 525/179; 525/221; 525/222; 525/240; 525/308
[58] Field of Search ..................................... 525/308, 100, 525/165, 166, 170, 178, 179, 221, 222, 240; 524/558, 524, 522, 523, 506, 513, 514, 528, 577

[56] References Cited

U.S. PATENT DOCUMENTS 5,508,090  4/1996  Peiffer et al. ............................ 428/214
5,597,677  1/1997  Kangas et al. ........................ 430/273.1

FOREIGN PATENT DOCUMENTS 0615839   9/1994   European Pat. Off. .
A7258478  10/1995  Japan .

OTHER PUBLICATIONS

Patent Abstracts of Japan, vol. 017, No. 274 (C–1064), May 27, 1993, JP5009349.
Database WPI, Section Ch, Week 8108, Derwent Publications Ltd., Class A17, AN 81–12484D, J55160043.
Database WPI, Section Ch, Week 8221, Derwent Publications Ltd., Class A17, AN 82–42825, J57064522.

*Primary Examiner*—Mark L. Warzel
*Attorney, Agent, or Firm*—Sughrue, Mion, Zinn, Macpeak & Seas, PLLC

[57] ABSTRACT

A polyolefin resin composition of the present invention comprising 0.01 to 2.0 parts by weight of an anti-blocking agent per 100 parts by weight of a polyolefin resin, wherein said anti-blocking agent has substantially two or more maximum values in a weight-based particle size distribution and a difference between a particle diameter giving the largest maximum value and a particle diameter giving the smallest maximum value is not less than 3.0 $\mu$m.

9 Claims, No Drawings

POLYOLEFIN RESIN COMPOSITION CONTAINING ANTI-BLOCKING AGENT

BACKGROUND OF THE INVENTION

1. Field of the Invention

The present invention relates to a polyolefin resin composition having excellent anti-blocking properties.

2. Description of the Related Art

Films of polyolefin resin composition, such as polyethylene or polypropylene are available for applications as wrapping films for food, fibers, pharmaceutical preparations, fertilizers, and other notions or as agricultural covering materials. For the improved handling properties in film processing, printing, and bag-making processes, an anti-blocking agent such as silica, talc, or zeolite, and a lubricant like organic amide are added to such polyolefin films.

Addition of a large quantity of anti-blocking agent for the improved blocking properties undesirably deteriorates the transparency and appearance of films and lowers the resistance to scratches arising on the film surface due to friction of films in transport.

Another method for improving the blocking properties by adding a substantial amount of lubricant to an anti-blocking agent is also known. This method, however, causes contamination of guide-rollers in bag-making or printing process and results in poor fabricability.

These conventional methods do not achieve sufficient and well-balanced improvement in required properties like anti-blocking properties, transparency, and sliding properties.

SUMMARY OF THE INVENTION

The object of the present invention is to provide a polyolefin resin composition having excellent anti-blocking properties, transparency, sliding properties, and scratch resistance.

As a result of intensive studies, the inventors have found that a resin composition containing a synthetic anti-blocking agent having a specific particle diameter distribution has excellent anti-blocking properties and transparency as well as well-balanced other properties including scratch resistance and sliding properties.

DETAILED DESCRIPTION OF THE INVENTION

The present invention is directed to a polyolefin resin composition comprising 0.01 to 2.0 parts by weight of an anti-blocking agent per 100 parts by weight of a polyolefin resin, wherein said anti-blocking agent has substantially two or more maximum values in a weight-based particle size distribution and a difference between a particle diameter giving the largest maximum value and a particle diameter giving the smallest maximum value is not less than 3.0 $\mu$m.

Polyolefin resins obtained by ionic polymerization or radical polymerization are used in the present invention.

Concrete examples of polyolefin resin include homopolymers such as polyethylene, polypropylene, poly(1-butene), and poly(4-methyl-1-pentene), ethylene- $\alpha$-olefin copolymers such as ethylene-propylene copolymer, ethylene-1-butene copolymer, ethylene-4-methyl-1-pentene copolymer, ethylene-1-hexene copolymer, ethylene-1-octene copolymer, ethylene-1-decene copolymer and ethylene-propylene-1-butene terpolymer, ethylene-methacrylate derivatives and ethylene-acrylate derivatives.

Other possible examples are copolymers of $\alpha$-olefins and multiple-unsaturated compounds such as conjugated dienes or non-conjugated dienes, copolymers of ethylene and unsaturated carboxylic acids such as acrylic acid, methacrylic acid or maleic acid, or esters or anhydrids of such unsaturated carboxilic acids and copolymers of ethylene and vinyl esters like vinyl acetate.

Other than these ethylene copolymers, propylene copolymers such as propylene-4-methyl-1-pentene copolymer or propylene-1-butene copolymer may also be used.

Such polyolefin resins may be used alone or in combination thereof.

The density of polyolefin resin used in the present invention is preferably from 0.880 to 0.970 g/cm$^3$, more preferably from 0.890 to 0.940 g/cm$^3$.

The melt flow rate is preferably 0.1 to 50 g/10 minutes, more preferably 0.2 to 20 g/10 minutes.

Especially, copolymers of ethylene and 3 to 10 carbon atom-containing $\alpha$-olefins are preferably used.

Both organic and inorganic anti-blocking agents are used as the anti-blocking agent of the present invention.

Examples of synthetic organic anti-blocking agent are a powder of crosslinked acrylic resins, crosslinked polystyrene resins, crosslinked silicone resins, polyamide resins and polyester resins. Especially, a powder of crosslinked poly (methyl methacrylate) is preferably used.

Examples of inorganic anti-blocking agent include natural anti-blocking agents like silica, clay, talc, diatomaceous earth, feldspar, kaolin, zeolite, kaolinite, wollastonite, and sericite, and synthetic anti-blocking agents like synthetic silica and crystalline or non-crystalline aluminosilicate powder. The surface of these inorganic anti-blocking agents may be processed with a surface treatment agent, for example, a higher fatty acid such as stearic acid, a titanium coupling agent or a silane coupling agent.

Some commercially available anti-blocking agents are also available to the present invention.

Examples of commercially available organic anti-blocking agents are 'MATSUMOTO MICROSPHERE-M' (manufactured by Matsumoto Yushi-Seiyaku Co., Ltd.), 'JURIMER MB-SX' (manufactured by Nihon Junyaku Co., Ltd.), and 'Eposter MA' (manufactured by NIPPON SHOKUBAI CO., LTD). Examples of commercially available inorganic anti-blocking agents include 'GLOMAX LL' (manufactured by Georgia Kaolin Company, US), 'SATINTONE W' (manufactured by ENGELHARD CORPORATION), 'INSULITE MC-6' and 'SILTON JC' (manufactured by Mizusawa Industrial Chemicals, Co., Ltd.), and 'SYLOSPHERE' (manufactured by Fuji Silysia Chemical Co., Ltd).

The anti-blocking agent applied to the present invention is polydisperse and has substantially two or more maximum values in a particle size distribution based on the weight measured by a Coulter counter or the like. The difference between a particle diameter giving the largest maximum value and a particle diameter giving the smallest maximum value is not less than 3.0 $\mu$m, preferably from not less than 3.0 $\mu$m to not greater than 12.0 m. When the difference is less than 3.0 $\mu$m, the particle distribution is substantially close to a monodisperse distribution and thereby it is impossible to improve the anti-blocking properties sufficiently.

A ratio of particles having smaller diameter than the particle diameter giving the smallest maximum value is preferably 10 to 90% by weight, more preferably 10 to 60% by weight, most preferably 10 to 40% by weight. When the ratio is less than 10% by weight, the transparency may lower. Whereas the ratio is greater than 90% by weight, the anti-blocking properties may deteriorate.

A mixture of two or more anti-blocking agents having monodisperse distributions may be available for the anti-blocking agent of the present invention in order to achieve a polydisperse distribution.

Alternatively, a synthetic anti-blocking agent previously controlled to have a polydisperse particle size distribution may also be used.

When a mixture of two or more anti-blocking agents is used, the difference between weight-average particle diameters of these anti-blocking agents is not less than 3.0 µm, preferably from not less than 3.0 µm to not greater than 12.0 µm.

It is preferable that the mixture of two or more anti-blocking agents includes an anti-blocking agent having a weight-average particle diameter of not greater than 8 µm and an anti-blocking agent having a weight-average particle diameter of greater than 8 µm, wherein the ratio of particles of not greater than 8 µm is from 10 to 90% by weight of the whole anti-blocking agents.

The mixture of anti-blocking agents may include the mixture of organic anti-blocking agents, the mixture of inorganic anti-blocking agents, or the mixture of organic and inorganic anti-blocking agents. Applicable examples are a mixture of crosslinked acrylic resin powders, a mixture of a crosslinked acrylic resin powder and a crosslinked silicone resin powder, a mixture of a crosslinked acrylic resin powder and a crosslinked polystyrene resin powder, a mixture of crosslinked acrylic resin powder and synthetic aluminosilicate powder, a mixture of synthetic aluminosilicate powders, a mixture of crosslinked acrylic resin powder and diatomaceous earth, and a mixture of crosslinked acrylic resin powder and silica.

The content of the anti-blocking agent is 0.01 to 2.0 parts by weight per 100 parts by weight of the polyolefin resin. When the content is less than 0.01 parts by weight, the anti-blocking properties do not sufficiently improve. While the content is greater than 2.0 parts by weight, the optical properties becomes worse.

A fatty amide compound may further be added to the polyolefin resin and the anti-blocking agent having a polydisperse particle size distribution.

The content of the fatty amide compound is 0 to 0.4 parts by weight, preferably 0.01 to 0.2 parts by weight per 100 parts by weight of the polyolefin resin. Addition of the fatty amide compound further improves the anti-blocking properties and enhances the sliding properties and scratch resistance.

When the fatty amide content is greater than 0.4 parts by weight, the transparency remarkably lowers due to bleeding and whitening on the film surface.

Available fatty amide compounds are saturated fatty amides, unsaturated fatty amides, saturated fatty bisamides, and unsaturated fatty bisamides. Such fatty amide compounds may be used alone or in combination thereof.

Examples of saturated fatty amides are palmitic acid amide, stearic acid amide and behenic acid amide.

Examples of unsaturated fatty amides are oleic acid amide and erucic acid amide.

Examples of saturated fatty bisamides are ethylene bis-palmitic acid amide, ethylene bis-stearic acid amide and hexamethylene bis-stearic acid amide.

Examples of unsaturated fatty bisamides are ethylene bis-oleic acid amide, hexamethylene bis-oleic acid amide and N,N'-dioleylsebacic acid amide.

The polyolefin resin composition of the present invention is prepared by homogeneously fusing and kneading the constituents.

Any known method may be available to manufacture the polyolefin resin composition. For example, the constituents are mixed with each other with a tumbling mixer or a Henschel mixer, and then fused, kneaded and granulated with a single screw extruder or a multi-screw extruder. Alternatively, the constituents are fused and kneaded with a kneader or a Banbury mixer, and then granulated with an extruder.

The polyolefin resin composition of the present invention may be prepared by mixing a high concentration of fused anti-blocking agent with a polyolefin resin to obtain master pellets and further adding a required amount of the polyolefin resin to the mixture.

This method is also available in the case of addition of a fatty amide compound.

The polyolefin resin composition may further include conventionally used antioxidants, antistatic agents, weather resistant agents, ultraviolet absorbing agents, anti-fogging agents and pigments, as long as such additives does not interfere the object of the present invention.

The polyolefin resin composition thus obtained is formed to a film by any known method, for example, air-cooling inflation, water-cooling inflation or casting. The thickness of the obtained film is generally 5 to 200 µm.

The polyolefin resin composition of the present invention may be formed alone or laminated with another thermoplastic resin composition. In the laminate molding process, it is preferable that the resin composition of the present invention forms at least one of outer layers. For example, dual-layered or multi-layered co-extruded films are manufactured by co-extruding and inflating, or co-extruding and casting the resin composition of the present invention and another appropriate resin such as polyethylene, polypropylene, ethylene-vinyl acetate copolymer, polyamide or polyester. Laminate films or laminate sheets are manufactured by forming the resin composition of the present invention alone or by co-extrusion and subsequently dry-laminating or sandwich-laminating the formed resin composition films with stretched or non-stretched films or sheets such as polypropylene, polyester, polyamide, aluminum foils, cellophane, paper or composite films or sheets thereof. Laminates are also manufactured by extrusion coating or co-extrusion coating the resin composition of the present invention over base materials like various plastic films, aluminum foils, paper plates and sheets.

Films prepared from the polyolefin resin composition of the present invention have excellent anti-blocking properties and transparency as well as improved sliding properties, scratch resistance, and fabricability. These films are available for various applications as wrapping films for food, fibers, pharmaceutical preparations, fertilizers, notions, and industrial parts or as agricultural covering materials or architectural covering materials.

EXAMPLES

The invention is described more in detail according to some examples, although these examples are only illustrative and not restrictive in any sense.

Materials used in Examples (1) Polyolefin resins

1) PO-1

Ethylene-1-hexene copolymer (MFR=2.0 g/10 minutes, d=0.912 g/cm$^3$)

2) PO-2

Ethylene-1-butene copolymer (MFR=2.2 g/10 minutes, d=0.905 g/cm$^3$)

PO-1 was prepared by high-pressure ionic polymerization in the presence of Ziegler catalyst, while PO-2 was prepared by solution polymerization in the presence of metallocene catalyst.

(2) Anti-blocking agents

1) ABA-1

Eposter MA1004 (manufactured by NIPPON SHOKUBAI CO., LTD.): weight-average particle diameter= 4.0μm, standard deviation=1.8 μm.

2) ABA-2

Eposter MA1006 (manufactured by NIPPON SHOKUBAI CO., LTD.): weight-average particle diameter= 6.5g m, standard deviation=3.2 μm.

3) ABA-3

Eposter MA1010 (manufactured by NIPPON SHOKUBAI CO., LTD.): weight-average particle diameter= 10.5 μm, standard deviation=6.3 μm.

4) ABA-4

Eposter MA1013 (manufactured by NIPPON SHOKUBAI CO., LTD.): weight-average particle diameter= 13.5 μm, standard deviation=6.7 μm.

All the above anti-blocking agents 1)–4) were crosslinked poly(methyl methacrylate) resin powder and had only one maximum value in the weight-based particle size distribution.

5) ABA-5

Crosslinked poly(methyl methacrylate) resin powder having two maximum values at 3.5 μm and 15.0 μm in the weight-based particle size distribution.

6) ABA-6

'SILTON JC' (manufactured by Mizusawa Industrial Chemicals, Co., Ltd.): weight-average particle diameter=4.9 μm, standard deviation=1.9 μm.

7) ABA-7

Diatomaceous earth: weight-average particle diameter= 5.5μm, standard deviation=0.89μm.

Preparation of Master Batches of Anti-blocking Agent

Master batches were prepared by fusing and kneading each of the above anti-blocking agents at the concentration of 10% by weight in the polyolefin resin with a Banbury mixer. Two or more master batches were mixed according to demand.

Preparation of Master Batch of Fatty Amide Compound

A master batch was prepared by fusing and kneading erucic acid amide at the concentration of 4.0% by weight in the polyolefin resin with a Banbury mixer.

Performances of films obtained in Examples and Comparative examples were measured and evaluated in the following manner.

(1) Weight-average particle diameter and particle size distribution

The weight-average particle diameter and the particle size distribution were measured with a Coulter counter, model TA-II (manufactured by Nikkaki Co., Ltd.): diameter of aperture: 20 to 200 μm, electrolysis solution: ISOTON II (2) Haze (transparency)

The haze was measured in conformity with ASTM D1003-61.

(3) Anti-blocking properties

After molding films from various master batches were left at 23±2° C. and 50±25%RH over 24 hours or longer, two films were laid one upon the other under a load of 400 g/cm² in an oven adjusted to 40° C. during seven days. The anti-blocking properties were measured by the maximum stress required for shear-peeling off a bonded film surface of 50 cm² under the condition of stress rate of 200 mm/minute with a constant crosshead rate tensile tester. The smaller values represent better anti-blocking properties.

(4) Coefficient of dynamic friction (sliding properties)

The coefficient of dynamic friction was measured in conformity with JIS K 7125-1987.

Examples 1–8 and Comparative Examples 1–6

The polyolefin resin PO-1 or PO-2, one of the master batches of anti-blocking agents or the mixture thereof, and the master batch of fatty amide compound were dry blended at a predetermined mixing ratio with a tumbling mixer. Single-layered films of 50 μm in thickness were manufactured at an extrusion rate of 10 kg/hr, a die temperature of 240° C., and a chill roll temperature of 75° C. with a film forming machine (manufactured by Tanabe Plastics Co., Ltd.) having a T-die (die width: 400 mm, die lip: 0.7 mm) and a 50 mm φ single screw extruder. The transparency, anti-blocking properties, and sliding properties of the films thus obtained were evaluated. The results of evaluation are shown in Table 1 to 4.

TABLE 1

| Composition | Examples | | | |
|---|---|---|---|---|
| | 1 | 2 | 3 | 4 |
| Polyolefin resin | | | | |
| Type | PO-1 | PO-1 | PO-1 | PO-1 |
| Content: parts by weight | 100 | 100 | 100 | 100 |
| Anti-blocking agent (1) | | | | |
| Type | ABA-1 | ABA-1 | ABA-2 | ABA-5 |
| Content: parts by weight | 0.4 | 0.5 | 0.5 | 0.7 |
| Weight-average particle diameter | 4.0 | 4.0 | 6.5 | — |
| Anti-blocking agent (2) | | | | |
| Type | ABA-3 | ABA-4 | ABA-4 | — |
| Content: parts by weight | 0.3 | 0.2 | 0.2 | 0 |
| Weight-average particle diameter | 10.5 | 13.5 | 13.5 | — |
| Fatty amide compound | | | | |
| Content: parts by weight | 0.04 | 0.04 | 0.04 | 0.04 |
| Weight-based particle diameter distribution | | | | |
| Number of maximum values | 2 | 2 | 2 | 2 |
| Particle diameter giving the smallest maximum value | 5.0 | 4.9 | 7.4 | 3.5 |
| Particle diameter giving the largest maximum value | 10.2 | 13.3 | 13.1 | 15.0 |
| Shear blocking g/50 mm in width | 92 | 85 | 129 | 80 |
| Haze % | 6.9 | 7.0 | 7.2 | 7.0 |
| Coefficient of dynamic friction | 0.11 | 0.11 | 0.10 | 0.11 |

TABLE 2

| Composition | Examples | | | |
|---|---|---|---|---|
| | 5 | 6 | 7 | 8 |
| Polyolefin resin | | | | |
| Type | PO-1 | PO-1 | PO-2 | PO-1 |
| Content: parts by weight | 100 | 100 | 100 | 100 |

TABLE 2-continued

|  | Examples | | | |
|---|---|---|---|---|
| Composition | 5 | 6 | 7 | 8 |
| Anti-blocking agent (1) | | | | |
| Type | ABA-6 | ABA-7 | ABA-1 | ABA-2 |
| Content: parts by weight | 0.5 | 0.6 | 0.4 | 0.5 |
| Weight-average particle diameter | 4.9 | 5.5 | 4.0 | 6.5 |
| Anti-blocking agent (2) | | | | |
| Type | ABA-4 | ABA-4 | ABA-4 | ABA-3 |
| Content: parts by weight | 0.5 | 0.1 | 0.1 | 0.2 |
| Weight-average particle diameter | 13.5 | 13.5 | 13.5 | 10.5 |
| Fatty amide compound | | | | |
| Content: parts by weight | 0.04 | 0.04 | 0.04 | 0.04 |
| Weight-based particle diameter distribution | | | | |
| Number of maximum values | 2 | 2 | 2 | 2 |
| Particle diameter giving the smallest maximum value | 5.0 | 6.3 | 4.8 | 7.1 |
| Particle diameter giving the largest maximum value | 13.5 | 13.2 | 12.8 | 10.3 |
| Shear blocking g/50 mm in width | 160 | 145 | 210 | 173 |
| Haze % | 6.6 | 6.9 | 6.0 | 7.2 |
| Coefficient of dynamic friction | 0.12 | 0.11 | 0.12 | 0.11 |

TABLE 3

|  | Comparative Examples | | | |
|---|---|---|---|---|
| Composition | 1 | 2 | 3 | 4 |
| Polyolefin resin | | | | |
| Type | PO-1 | PO-1 | PO-1 | PO-1 |
| Content: parts by weight | 100 | 100 | 100 | 100 |
| Anti-blocking agent (1) | | | | |
| Type | ABA-1 | ABA-4 | ABA-6 | ABA-7 |
| Content: parts by weight | 0.7 | 0.7 | 0.7 | 0.7 |
| Weight-average particle diameter | 4.0 | 13.5 | 4.9 | 5.5 |
| Anti-blocking agent (2) | | | | |
| Type | — | — | — | — |
| Content: parts by weight | 0 | 0 | 0 | 0 |
| Weight-average particle diameter | — | — | — | — |
| Fatty amide compound | | | | |
| Content: parts by weight | 0.04 | 0.04 | 0.04 | 0.04 |
| Weight-based particle diameter distribution | | | | |
| Number of maximum values | 1 | 1 | 1 | 1 |
| Particle diameter giving maximum value | 4.8 | 13.4 | 4.9 | 5.8 |
| Shear blocking g/50 mm in width | 480 | 450 | 840 | 950 |
| Haze % | 7.0 | 8.1 | 5.8 | 6.8 |
| Coefficient of dynamic friction | 0.13 | 0.13 | 0.15 | 0.14 |

TABLE 4

|  | Comparative Examples | |
|---|---|---|
| Composition | 5 | 6 |
| Polyolefin resin | | |
| Type | PO-2 | PO-1 |
| Content: parts by weight | 100 | 100 |
| Anti-blocking agent (1) | | |
| Type | ABA-1 | ABA-2 |
| Content: parts by weight | 0.5 | 0.9 |
| Weight-average particle diameter | 4.0 | 6.5 |
| Anti-blocking agent (2) | | |
| Type | — | — |
| Content: parts by weight | 0 | 0 |
| Weight-average particle diameter | — | — |
| Fatty amide compound | | |
| Content: parts by weight | 0.04 | 0.04 |
| Weight-based particle diameter distribution | | |
| Number of maximum values | 1 | 1 |
| Particle diameter giving maximum value | 4.8 | 7.3 |
| Shear blocking g/50 mm in width | 750 | 200 |
| Haze % | 5.9 | 8.8 |
| Coefficient of dynamic friction | 0.13 | 0.12 |

What is claimed is:

1. A polyolefin resin composition comprising 0.01 to 2.0 parts by weight of an anti-blocking agent per 100 parts by weight of a polyolefin resin, wherein said anti-blocking agent is selected from the group consisting of an organic anti-blocking agent, a mixture of organic anti-blocking agents and a mixture of organic and inorganic anti-blocking agents, wherein said organic anti-blocking agent is selected from the group consisting of a crosslinked acrylic resin, crosslinked polystyrene resin, crosslinked silicone resin, polyamide resin and polyester resin, and said anti-blocking agent has two or more maximum values in a weight-based particle size distribution, and a difference between a largest particle diameter corresponding to a maximum value of said particle size distribution, and a smallest particle diameter corresponding to a maximum value of said particle size distribution, is not less than 3.0 $\mu$m.

2. A polyolefin resin composition according to claim 1, wherein said anti-blocking agent comprises a mixture of two or more anti-blocking agents having a monodisperse particle size distribution and a difference between weight-average particle diameters of said two or more anti-blocking agents is not less than 3.0 $\mu$m.

3. A polyolefin resin composition according to claim 1, wherein said anti-blocking agent comprises a mixture of a anti-blocking agent having a weight-average particle diameter of not greater than 8 $\mu$m and a anti-blocking agent having a weight-average particle diameter of greater than 8 $\mu$m, and the ratio of particles of not greater than 8 $\mu$m is from 10 to 90% by weight of the whole anti-blocking agents.

4. A polyolefin resin composition according to claim 1, wherein said anti-blocking agent is a mixture of organic anti-blocking agents.

5. A polyolefin resin composition according to claim 1, wherein said anti-blocking agent is a crosslinked acrylic resin.

6. A polyolefin resin composition according to claim 1, wherein said polyolefin resin is polyethylene resin.

7. A polyolefin resin composition according to claim 1, wherein said polyolefin resin is ethylene- α-olefin copolymer.

8. A polyolefin resin composition according to claim 1 further containing 0 to 0.4 parts by weight of a fatty amide compound to 100 parts by weight of the polyolefin resin.

9. A polyolefin resin composition according to claim 1, wherein said anti-blocking agent is a mixture of organic and inorganic anti-blocking agents.

\* \* \* \* \*